United States Patent [19]

Hupfer et al.

[11] Patent Number: 5,044,787
[45] Date of Patent: Sep. 3, 1991

[54] SLIT CAGE, PARTICULARLY FOR NEEDLE BEARINGS

[75] Inventors: Georg Hupfer, Erlangen; Johann Vitzthum, Altforf; Roland Tischer, Dittelbrunn, all of Fed. Rep. of Germany

[73] Assignee: FAG Kugelfischer Georg Schafer (KGaA), Fed. Rep. of Germany

[21] Appl. No.: 463,928

[22] Filed: Jan. 8, 1990

Related U.S. Application Data

[63] Continuation of Ser. No. 255,623, Oct. 11, 1988, abandoned.

[30] Foreign Application Priority Data

Nov. 27, 1987 [DE] Fed. Rep. of Germany ....... 8715732

[51] Int. Cl.⁵ .............................................. F16C 33/46
[52] U.S. Cl. ................................... 384/572; 384/576; 384/577
[58] Field of Search ............... 384/577, 572, 526, 576, 384/580, 575; 277/217

[56] References Cited

U.S. PATENT DOCUMENTS 3,399,008  8/1968  Farrell et al.
4,222,620  9/1980  Mirring .............................. 384/576
4,235,487 11/1980  Schard .............................. 384/576

Primary Examiner—Lenard A. Footland
Attorney, Agent, or Firm—Ostrolenk, Faber, Gerb & Soffen

[57] ABSTRACT

A cage, particularly for needle bearings, is an annular ring of springy cage material and has a slit extending completely through the cage. The opposed, separated ends of the cage at the slit are joined by a pair of elastic connecting arms which are each approximately of V-shape and having vertices which extend axially and either face toward each other or face away from each other, which permits circumferential shifting and inhibits relative axial shifting of the separated cage ends and prevents overlap at the cage ends.

6 Claims, 1 Drawing Sheet

SLIT CAGE, PARTICULARLY FOR NEEDLE BEARINGS

This is a continuation of application Ser. No. 07/255,623 filed on Oct. 11, 1988.

BACKGROUND OF THE INVENTION

The present invention relates to a slit cage or rolling element separator, particularly for needle bearings, and the invention particularly relates to a connection between the opposed ends of the slit cage.

A cage is annular and a slit cage typically has a break or slit along its length, producing facing, opposed ends at the slit. Cages of this type are installed, for instance, in needle bearings for gears. The gear rides on a shaft through such a bearing. The slit is necessary in order to permit continued travel of the cage when the gear and the shaft are not carrying out any relative movement with respect to each other. This avoids production of so-called "ripples" in these parts.

For various reasons, the cages have connecting elements in the region of their slit. As shown, for instance, in U.S. Pat. No. 3,399,008, these connecting elements may be of widely varied shapes. These connecting elements are disadvantageous in part because additional connecting means or expensive formations also must be provided on the ends of the cage in the region of the slit. In most cases, the play or movement of the cage ends in the circumferential direction, which is required for avoiding ripples, is too small. All of the known embodiments also have the disadvantage that the connection between the cage ends in the region of the slit must be opened upon installation. However, upon installation of the slit cage into the gear by machine, the cage ends are frequently not in the correct position with respect to each other. Overlapping occurs frequently. In such cases, machine installation of the case is no longer possible.

SUMMARY OF THE INVENTION

The object of the invention is further to improve a slit cage, particularly for use with needle bearings, such that its cage ends in the region of the slit are as precisely opposite each other as possible which makes automatic installation of the cage possible without problems and such that the elasticity of the cage, which is necesary for the prevention of ripples, is retained.

According to the invention, the cage for the needle bearing is an annular ring that is preferably comprised of springy cage material, such as springy metal or plastic. The cage is provided with a plurality of completely surrounded pockets around its circumference, which pockets are open radially inwardly and radially outwardly. Bearing needles are each disposed in one of the pockets and are of a thickness to project radially outwardly and inwardly of the cage. The separated opposed cage ends at the slit are joined by at least one and preferably by a plurality and more particularly by two connecting arms integrally connected to the opposed ends The arms are so comprised, shaped and oriented as to permit the opposed cage ends to move toward and away from each other but to inhibit or oppose respective lateral shifting of one cage end with respect to the other in the axial direction of the cage. In particular, each of the connecting arms is elastic. Further, each elastic arm is preferably V-shaped, and the vertex of the V is between the connecting ends and preferably extends axially of the cage. The elastic arms are oriented so that the vertices of the arms extend axially in opposite directions, so that the biasing forces of the cooperating elastic arms oppose each other and thereby also prevent the lateral shifting of the cage ends. In one embodiment the vertices of the two elastic arms axially face toward each other. In an alternate just as effective embodiment, those vertices axially face away from each other.

Because the connecting elements comprise elastic arms which are developed integral with the opposed ends of the cage, at the slit, the opposed ends of the cage are always precisely opposite each other. Overlap is thus no longer possible or at most highly unlikely. Installation of the cages by machine is now possible. Ovalizations that are produced upon the transportation of the unarranged cages or by internal stresses are thereby so reduced that no difficulties from that will occur. When the elastic arms press the cage ends away from each other, there is better application of the needles against the surface of the bore of the gear wheel. Due to the spring effect, this reduces the danger of the formation of ripples.

In accordance with the preferred embodiment, in order to provide greater elasticity to the connection of the cage ends, the arms at the cage ends have an approximately V shape, as seen in radial top view. In order that no offset of the cage ends with respect to each other in the axial direction will occur, the two vertices of the elastic arms either face each other or face away from each other. The forces coming from the V-shaped arms are thereby counteracted and axial displacement of their ends with respect to each other is avoided.

Other objects and features of the invention are described with reference to the drawings.

DESCRIPTION OF A PREFERRED EMBODIMENT

Figure 1:
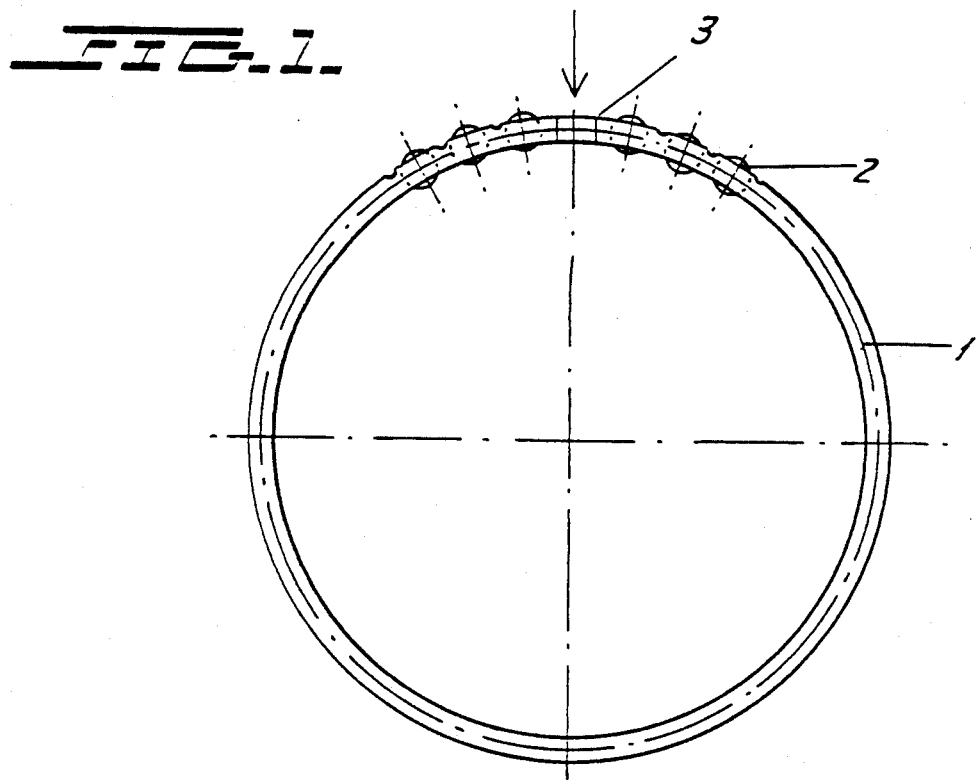
FIG. 1 shows a bearing set comprising a slit ring with needles.

Bearing sets, such as that shown in FIG. 1, are customarily placed between a gear wheel and a shaft of gearing. The bearing set comprises an annular ring pocket cage 1 with surrounded pockets that extend radially through the cage and are open at their radial ends. The cage is comprised of resilient material, such as a somewhat springy metal or plastic Needles are introduced into the pockets The pockets and the needles are distributed over the entire circumference of the cage. Each needle is installed in its pocket under spring action. The cage 1 is provided with a slit 3 extending completely across the cage and located at one point around its circumference. That makes the cage 1 elastic in the circumferential direction and also enables its slight expansion and contraction, so that the production of ripples in the roll surfaces is prevented.

Figure 2:
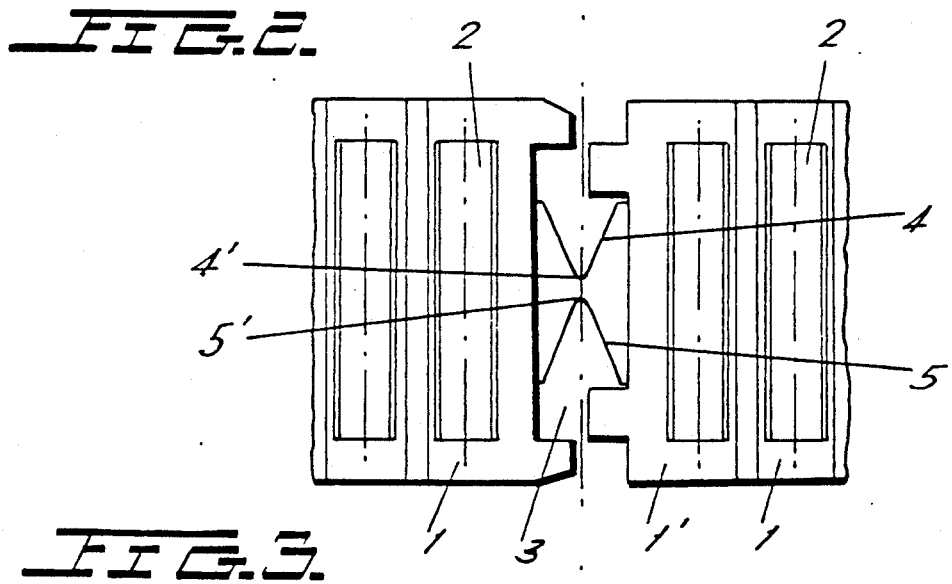
FIG. 2 shows an enlarged radial top view of the cage of FIG. 1 in the region of the slit.

In FIG. 2, the two opposed cage ends 1' at the slit 3 are connected in the region of the slit 3. Here, two approximately V-shaped and elastic arms 4 and 5 are provided each connected to the opposed cage ends at axially separated locations. Each thin arm is like a spring. The uninterrupted connection provided by the arms 4 and 5 causes the cage ends 1' to always be opposite each other in approximately the same plane. This permits circumferential shifting but prevents overlapping and makes installation by machine possible The elasticity in this connection remains so great that the formation of ripples is avoided. This is further considerably supported by the spring effect of the arms.

In order to avoid or at least inhibit an axial offset of the cage ends 1', the two V-shaped arms are arranged so that their respective vertices 4' and 5' are directed axially of the cage and toward each other. Internal stresses possibly induced in the arms 4 and 5 thereby compensate for each other.

Figure 3:
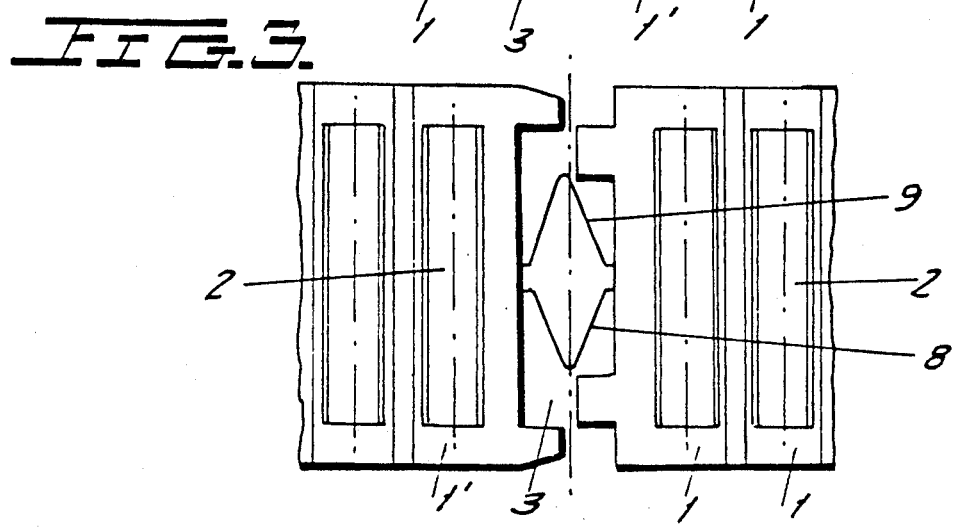
FIG. 3 is the same type of view of FIG. 2 showing an alternate embodiment of the cage.

In the alternate embodiment of FIG. 3, all elements are the same as in FIG. 2 except that the vertices of the V-shaped arms 8 and 9 face away from each other instead of facing toward each other as in FIG. 2. The operation of this second embodiment and its effectiveness would be the same as the embodiment of FIG. 2.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A bearing cage, comprising:

an annular ring having a circumference, an axis, pockets defined around said circumference for receiving bearings, and spaced-apart opposed ends, said ring being resilient so that said opposed ends may be resiliently moved further apart from each other and toward each other in a circumferential direction to prevent ripples; and uninterrupted connecting elements each of which is connected to each of said ends of said ring so as to prevent relative axial movement of said ends of said ring, each of said connecting elements being in the form of an elastic arm so as to permit the resilient movement of said opposed ends in the circumferential direction.

2. The bearing cage of claim 1, wherein each of said arms is V-shaped, each of said V-shaped arms having a vertex and an opposite end, said vertexes being located between said opposed ends of said ring.

3. The bearing cage of claim 2, wherein said vertexes are located between said opposite ends of said arms.

4. The bearing cage of claim 2, wherein said opposite ends of said arms are located between said vertexes.

5. The bearing cage of claim 1, wherein said ring is formed of springy material.

6. The bearing cage of claim 1, further comprising a set of bearing needles, each of said needles being located within a respective one of said pockets, said needles projecting outwardly and inwardly of said ring.

* * * * *